US007165881B2

(12) United States Patent
Holl

(10) Patent No.: US 7,165,881 B2
(45) Date of Patent: Jan. 23, 2007

(54) METHODS AND APPARATUS FOR HIGH-SHEAR MIXING AND REACTING OF MATERIALS

(75) Inventor: Richard A. Holl, Camarillo, CA (US)

(73) Assignee: Holl Technologies Corporation, Camarillo, CA (US)

(*) Notice: Subject to any disclaimer, the term of this patent is extended or adjusted under 35 U.S.C. 154(b) by 18 days.

(21) Appl. No.: 10/661,170

(22) Filed: Sep. 11, 2003

(65) Prior Publication Data
US 2004/0052158 A1 Mar. 18, 2004

Related U.S. Application Data

(60) Provisional application No. 60/410,185, filed on Sep. 11, 2002.

(51) Int. Cl.
B01F 13/00 (2006.01)

(52) U.S. Cl. .................. 366/341; 366/348; 366/349; 422/100

(58) Field of Classification Search ................ 366/336, 366/341, 181.7, 181.5, DIG. 1, DIG. 3, 348, 366/349; 422/99, 100, 102
See application file for complete search history.

(56) References Cited

U.S. PATENT DOCUMENTS

| 591,494 | A | 10/1897 | Pond | |
|---|---|---|---|---|
| 2,261,257 | A | 11/1941 | Kiesskalt et al. | 241/228 |
| 2,295,740 | A | 9/1942 | Keen | 261/93 |
| 2,314,598 | A | 3/1943 | Phelan | 62/114 |
| 2,474,006 | A | 6/1949 | Maycock | 261/83 |
| 2,577,247 | A | 12/1951 | Irwin | 99/221 |
| 3,095,349 | A | 6/1963 | Rich | 162/236 |
| 3,215,642 | A | 11/1965 | Levy | 252/359 |
| 3,595,531 | A | 7/1971 | Williams et al. | 259/7 |

(Continued)

FOREIGN PATENT DOCUMENTS

DE 299 02 348 4/1999

(Continued)

OTHER PUBLICATIONS

International Search Report (ISA/US) of Mar. 16, 2004 of PCT/US03/28747.
PCT International Search Report for PCT/US00/18038, Holl Technologies Company, completed Sep. 17, 2000, mailed Oct. 6, 2000.
PCT International Search Report for PCT/US01/15258, Holl Technologies Company, completed Jan. 24, 2002, mailed Feb. 1, 2002.
PCT International Search Report for PCT/US01/20635, Holl Technologies Company, completed Jan. 24, 2002, mailed Feb. 1, 2002.
PCT International Search Report for PCT/US01/23657, Holl Technologies Company, completed Apr. 25, 2002, mailed May 6, 2002.

(Continued)

Primary Examiner—Tony G. Soohoo
(74) Attorney, Agent, or Firm—Marlan Walker; Peter Gluck; Greenberg Traurig LLP

(57) ABSTRACT

Methods and apparatus for high shear reacting and/or mixing of moving fluid streams of materials employ an interdiffusing and reacting zone formed in the space between two stationary surfaces, the surfaces being spaced apart a maximum distance of the sum of the thicknesses of the back-to-back boundary layers of the materials and/or resulting materials on the surfaces, to a value such that any third layer between the two boundary layers is too thin to support agitation characterized by turbulent convection and/or to cause channeling. The materials are interdiffused by high speed laminar shear produced by the flow of the materials rather than mixed by macroscopic convection, the materials being driven by high velocity inlet feeds, auxiliary high pressure gas flow pumped into the reaction/mixing zone, or auxiliary high pressure gas flow created as an evolving gaseous byproduct of any chemical reaction that may occur.

6 Claims, 2 Drawing Sheets

U.S. PATENT DOCUMENTS

| | | | |
|---|---|---|---|
| 3,841,814 A | 10/1974 | Eckhardt | 425/208 |
| 3,870,082 A | 3/1975 | Holl | 138/40 |
| 4,000,993 A | 1/1977 | Holl | 55/94 |
| 4,057,331 A | 11/1977 | Ong et al. | 350/285 |
| 4,071,225 A | 1/1978 | Holl | 366/114 |
| 4,073,567 A | 2/1978 | Lakerveld et al. | 350/6.5 |
| 4,174,907 A | 11/1979 | Suh et al. | 366/279 |
| 4,198,383 A | 4/1980 | Konsetov et al. | 422/134 |
| 4,251,576 A | 2/1981 | Osborn et al. | 428/331 |
| 4,287,075 A | 9/1981 | Fujiwara et al. | 501/135 |
| 4,306,165 A | 12/1981 | Kitabayashi et al. | 310/59 |
| 4,311,570 A | 1/1982 | Cowen et al. | 204/157.1 |
| 4,315,172 A | 2/1982 | Intichar et al. | 310/53 |
| 4,335,180 A | 6/1982 | Traut | 428/303 |
| 4,405,491 A | 9/1983 | Sando et al. | 252/359 |
| 4,556,467 A | 12/1985 | Kuhn et al. | 241/193 |
| 4,593,754 A | 6/1986 | Holl | 165/109.1 |
| 4,670,103 A | 6/1987 | Holl | 165/109.1 |
| 4,708,198 A | 11/1987 | Holl | 165/109.1 |
| 4,744,521 A | 5/1988 | Singer et al. | 241/66 |
| 4,769,131 A | 9/1988 | Noll et al. | 210/85 |
| 4,778,631 A | 10/1988 | Cobbs, Jr. et al. | 261/128 |
| 4,784,218 A | 11/1988 | Holl | 165/109.1 |
| 4,889,909 A | 12/1989 | Besecke et al. | 528/125 |
| 4,921,473 A | 5/1990 | Lee et al. | 494/27 |
| 4,930,708 A | 6/1990 | Chen | 241/65 |
| 4,983,307 A | 1/1991 | Nesathurai | 210/748 |
| 5,154,973 A | 10/1992 | Imagawa et al. | 428/325 |
| 5,198,137 A | 3/1993 | Rutz et al. | 252/62.54 |
| 5,204,416 A | 4/1993 | Mercer et al. | 525/390 |
| 5,212,278 A | 5/1993 | Pfaendner et al. | 528/171 |
| 5,227,637 A | 7/1993 | Herold et al. | 250/438 |
| 5,268,140 A | 12/1993 | Rutz et al. | 75/246 |
| 5,279,463 A | 1/1994 | Holl | 241/1 |
| 5,300,019 A | 4/1994 | Bischof et al. | 604/4 |
| 5,335,992 A | 8/1994 | Holl | 366/348 |
| 5,358,775 A | 10/1994 | Horn, III | 428/209 |
| 5,370,824 A | 12/1994 | Nagano et al. | 366/279 |
| 5,370,999 A | 12/1994 | Stuart | 435/99 |
| 5,391,603 A | 2/1995 | Wessel et al. | 524/396 |
| 5,395,914 A | 3/1995 | Wilharm et al. | 528/125 |
| 5,449,652 A | 9/1995 | Swartz et al. | 501/134 |
| 5,471,037 A | 11/1995 | Goethel et al. | 219/750 |
| 5,484,647 A | 1/1996 | Nakatani et al. | 428/209 |
| 5,506,049 A | 4/1996 | Swei et al. | 428/323 |
| 5,523,169 A | 6/1996 | Rafferty et al. | 428/551 |
| 5,538,191 A | 7/1996 | Holl | 241/1 |
| 5,552,210 A | 9/1996 | Horn, III et al. | 428/209 |
| 5,554,323 A | 9/1996 | Tsukimi et al. | 264/4.7 |
| 5,558,820 A | 9/1996 | Nagano et al. | 264/4.1 |
| 5,576,386 A | 11/1996 | Kempter et al. | 526/88 |
| 5,658,485 A | 8/1997 | Cava et al. | 252/62.9 |
| 5,658,994 A | 8/1997 | Burgoyne, Jr. et al. | 525/390 |
| 5,659,006 A | 8/1997 | White | 528/212 |
| 5,674,004 A | 10/1997 | Takeuchi | 366/69 |
| 5,693,742 A | 12/1997 | White et al. | 528/212 |
| 5,716,852 A * | 2/1998 | Yager et al. | 436/172 |
| 5,739,193 A | 4/1998 | Walpita et al. | 524/413 |
| 5,754,936 A | 5/1998 | Jansson | 419/10 |
| 5,855,865 A | 1/1999 | Lambert et al. | 424/9.52 |
| 5,858,187 A * | 1/1999 | Ramsey et al. | 204/452 |
| 5,874,516 A | 2/1999 | Burgoyne, Jr. et al. | 528/219 |
| 5,929,138 A | 7/1999 | Mercer et al. | 523/220 |
| 5,932,100 A * | 8/1999 | Yager et al. | 210/634 |
| 5,971,158 A * | 10/1999 | Yager et al. | 209/155 |
| 5,974,867 A | 11/1999 | Forster et al. | 73/61.41 |
| 5,998,533 A | 12/1999 | Weber et al. | 524/540 |
| 6,039,784 A | 3/2000 | Luk | 75/231 |
| 6,040,935 A | 3/2000 | Michalicek | 359/198 |
| 6,074,472 A | 6/2000 | Jachow et al. | 106/436 |
| 6,093,636 A | 7/2000 | Carter et al. | 438/623 |
| 6,134,950 A * | 10/2000 | Forster et al. | 73/54.01 |
| 6,136,272 A | 10/2000 | Weigl et al. | 422/82.05 |
| 6,143,052 A | 11/2000 | Kiyokawa et al. | 75/230 |
| 6,159,739 A * | 12/2000 | Weigl et al. | 436/52 |
| 6,176,991 B1 | 1/2001 | Nordman | 204/601 |
| 6,190,034 B1 | 2/2001 | Nielsen et al. | 366/336 |
| 6,281,254 B1 * | 8/2001 | Nakajima et al. | 516/53 |
| 6,281,433 B1 | 8/2001 | Decker et al. | 174/35 |
| 6,391,082 B1 | 5/2002 | Holl | 75/230 |
| 6,464,936 B1 | 10/2002 | Mowat et al. | 422/22 |
| 6,471,392 B1 | 10/2002 | Holl et al. | 366/279 |
| 6,723,999 B2 * | 4/2004 | Holl | 250/438 |
| 6,742,774 B2 * | 6/2004 | Holl | 261/83 |
| 2001/0030295 A1 | 10/2001 | Holl | 250/492.23 |
| 2002/0038582 A1 | 4/2002 | Holl | 75/230 |
| 2002/0078793 A1 | 6/2002 | Holl | 75/230 |
| 2002/0089074 A1 | 7/2002 | Holl | 261/92 |
| 2002/0148640 A1 | 10/2002 | Holl | 174/256 |
| 2003/0043690 A1 | 3/2003 | Holl | 366/279 |
| 2003/0048694 A1* | 3/2003 | Horner et al. | 366/337 |
| 2003/0066624 A1 | 4/2003 | Holl | 165/47 |

FOREIGN PATENT DOCUMENTS

| | | |
|---|---|---|
| DE | 299 19 570 | 1/2000 |
| EP | 0 219 357 | 4/1987 |
| EP | 0 660 336 | 6/1995 |
| GB | 891 152 | 3/1962 |
| GB | 1 232 644 | 5/1971 |
| GB | 1 252 192 | 11/1971 |
| GB | 2 192 558 | 1/1988 |
| JP | 58 144549 | 8/1983 |
| JP | 3 279991 | 12/1991 |
| JP | 11322920 | 11/1999 |
| JP | 2000-213876 | 8/2000 |
| SU | 369 939 | 4/1973 |
| SU | 957 991 | 9/1982 |
| SU | 1 737 241 | 5/1992 |
| WO | WO 97 12665 | 4/1997 |
| WO | WO 97 42639 | 11/1997 |
| WO | WO 98 49675 | 11/1998 |
| WO | WO 02 071451 | 9/2002 |
| WO | WO 03 022415 | 3/2003 |

OTHER PUBLICATIONS

PCT International Search Report for PCT/US02/11575, Holl Technologies Company, completed Jul. 12, 2002, mailed Aug. 6, 2002.

PCT International Search Report for PCT/US02/29093, Holl Technologies Company, completed Mar. 6, 2003, mailed Mar. 17, 2003.

PCT International Search Report for PCT/US02/31076, Holl Technologies Company, completed Dec. 11, 1002, mailed Dec. 27, 2002.

PCT International Search Report for PCT/US02/05361, Holl Technologies Company, completed May 17, 2002, mailed Jun. 5, 2002.

www.pooleplastics.com/production.html, Poole Plastics and Tooling Company, Production Capabilities; Feb. 15, 2001.

Zlotorzynski; "The Application of Microwave Radiation to Analytical and Environmental Chemistry;" Critical Reviews in Analytical Chemistry; vol. 25, No. 1; pp. 43-76; 1995.

"Microwave Heating Mechanisms;" Microwave Chemistry, 11 pgs, May 8, 2000.

"A Basic Introduction to Microwave Chemistry;" Microwave Chemistry, 3 pgs, May 8, 2000.

"Fast and Furious;" Microwave Chemistry, 4 pgs, May 8, 2000.

"Microwave Heating Applied to Polymers;" Microwave Chemistry, 4 pgs, May 8, 2000.

"Applications of Microwaves to Organic Chemistry;" Microwave Chemistry, 13 pgs, May 8, 2000.

"Microwave Chemistry in Liquid Media;" Microwave Chemistry, 2 pgs, May 8, 2000.

"Microwave Heating and Intercalation Chemistry;" Microwave Chemistry, 4 pgs, May 8, 2000.

US 6,159,264, 12/2000, Holl (withdrawn)

* cited by examiner

METHODS AND APPARATUS FOR HIGH-SHEAR MIXING AND REACTING OF MATERIALS

CROSS-REFERENCE TO RELATED APPLICATIONS

This application claims the benefit of the prior filing date of U.S. provisional patent application No. 60/410,185, filed Sep. 11, 2002, herein incorporated by reference in its entirety.

BACKGROUND OF THE INVENTION

1. Field of the Invention

The invention is concerned with methods and apparatus for high-shear mixing and reacting of materials involving a chemical and/or a physical action(s) or reaction(s) of a component or between components.

2. Review of the Prior Art

Apparatus for materials processing consisting of coaxial cylinders that are rotated relative to one another about a common axis, the materials to be processed being fed into the annular space between the cylinders, are known, as shown for example, in U.S. Pat. No. 5,370,999, issued 6 Dec. 1994 to Colorado State University Researeh Foundation, and U.S. Pat. No. 5,340,891, issued 23 Aug. 1994 to Nippon Paint Co., Ltd. My U.S. Pat. No. 5,279,463 (issued 18 Jan. 1994); U.S. Pat No. 5,538,191 (issued 23 Jul. 1996); and pending U.S. Pat. No. 6,471,392 (issued Oct. 29, 2002) disclose methods and apparatus for high-shear material treatment, one type of the apparatus consisting of a rotor rotating within a stator to provide an annular flow passage comprising a flow path of uniform radial dimension along its length containing a high-shear treatment zone in which free supra-Kolmogoroff eddies are suppressed during passage of the material therethrough. In another type of the apparatus the passage spacing at one location on its circumference is smaller than in the remainder of the zone to provide a subsidiary higher-shear treatment zone in which free supra-Kolmogoroff eddies are suppressed.

Couette developed an apparatus for measuring the viscosity of a liquid consisting of a cylinder immersed in the liquid contained in a rotating cylindrical vessel, the viscosity being measured by measuring the torque that was thus applied to the cylinder. It was found that a linear relationship was obtained between the viscosity measurement and the angular velocity of the rotor surface up to a certain value beyond which the linear relationship broke down. This phenomenon was investigated by G. I. Taylor who showed that when a certain Reynolds number was exceeded the previously stratified flow in the annulus between the two cylindrical surfaces became unstable and vortices appeared, now known as Taylor vortices, whose axes are located along the circumference of the rotor parallel to its axis of rotation and which rotate in alternately opposite directions. The conditions for the flow to be become unstable in this manner can be expressed with the aid of a characteristic number known as the Taylor number, depending upon the radial width of the annular gap, the radius of the rotor and its peripheral velocity. I have found, as described in my pending U.S. application Ser. No. 09/802,037 (filed Mar. 7, 2001), the disclosure of which is incorporated herein by this reference, that when using such apparatus for the types of process where thorough mixing is required, the presence of the Taylor vortices inhibits the action or reaction desired since the material to be treated becomes partially entrapped in the vortices, whereupon mixing is impaired and is required to be replaced by much slower diffusion processes.

BRIEF SUMMARY OF THE INVENTION

It is a principal object of the invention to provide new methods and apparatus for high-shear mixing and reacting of materials wherein interdiffusion mixing can be obtained rather than macroscopic convection mixing, and the apparatus employed can be operated without the presence of Taylor vortices so that such interdiffusion mixing is obtained.

It is another more specific object to provide new methods and apparatus for high-shear mixing and reacting of materials wherein interdiffusion mixing can be obtained rather than macroscopic convection mixing without requiring the use of relatively moving surfaces in the treatment passage.

In accordance with the invention there is provided a new method for high-shear mixing and reacting of materials comprising:

supplying a first material to a flow path through an interdiffusion passage between two parallel, closely spaced, stationary surfaces at a respective first flow rate;

supplying a second material to the flow path through the interdiffusion passage at a respective second flow rate, to be interdiffused with the first material therein, with resultant material from the interdiffusion and any consequent reaction moving in the flow path at a respective resultant flow rate;

wherein the first and the second materials, and material resulting from interdiffusion and any consequent reaction of the materials, form respective boundary layers against both surfaces;

wherein the radial spacing between the two parallel surfaces is equal to or less than the back-to-back radial thicknesses of the two laminar boundary layers of material against the two surfaces, and if larger than the back-to-back radial thicknesses with a third layer between the two boundary layers has the third layer too thin to support turbulent convection or uneven channeling; and wherein the flow rates of the materials in the flow path are such that they are subjected to laminar shear of the value required for the interdiffusion.

Also in accordance with the invention there is provided new apparatus for high-shear mixing and reacting of materials comprising:

apparatus structure providing two closely spaced stationary surfaces constituting between them a flow path that is an interdiffusion passage;

means supplying a first material to the flow path through the interdiffusion passage at a respective first flow rate;

means supplying a second material to the flow path through the interdiffusion passage at a respective second flow rate, to be interdiffused with the first material therein, with resultant material from the interdiffusion and any consequent reaction moving in the flow path at a respective resultant flow rate;

wherein the first and the second materials, and material resulting from interdiffusion and any consequent reaction of the materials, form respective laminar boundary layers against both surfaces;

wherein the radial spacing between the two parallel surfaces is equal to or less than the back-to-back radial thicknesses of the two boundary layers of the material against the two surfaces, and if larger than the back-to-back radial thicknesses with a third layer between the two boundary layers has the third layer too thin to support turbulent convection or uneven channeling; and wherein the means supplying the first and second materials supply those materials at flow rates such that the materials in the passage are subjected to laminar shear of the value required for the interdiffusion.

Preferably, the two parallel spaced surfaces are provided by two cylindrical apparatus members mounted one within the other, so that the inner surface of the outer member and the outer surface of the inner member constitute two parallel, closely spaced smooth surfaces providing an annular interdiffusion passage constituting the flow path for the materials.

DESCRIPTION OF THE DRAWINGS

Methods and apparatus that are particular preferred embodiments of the invention will now be described, by way of example, with reference to the accompanying diagrammatic drawings.

LIST OF REFERENCE NUMBERS IN DRAWINGS

Figure 1:
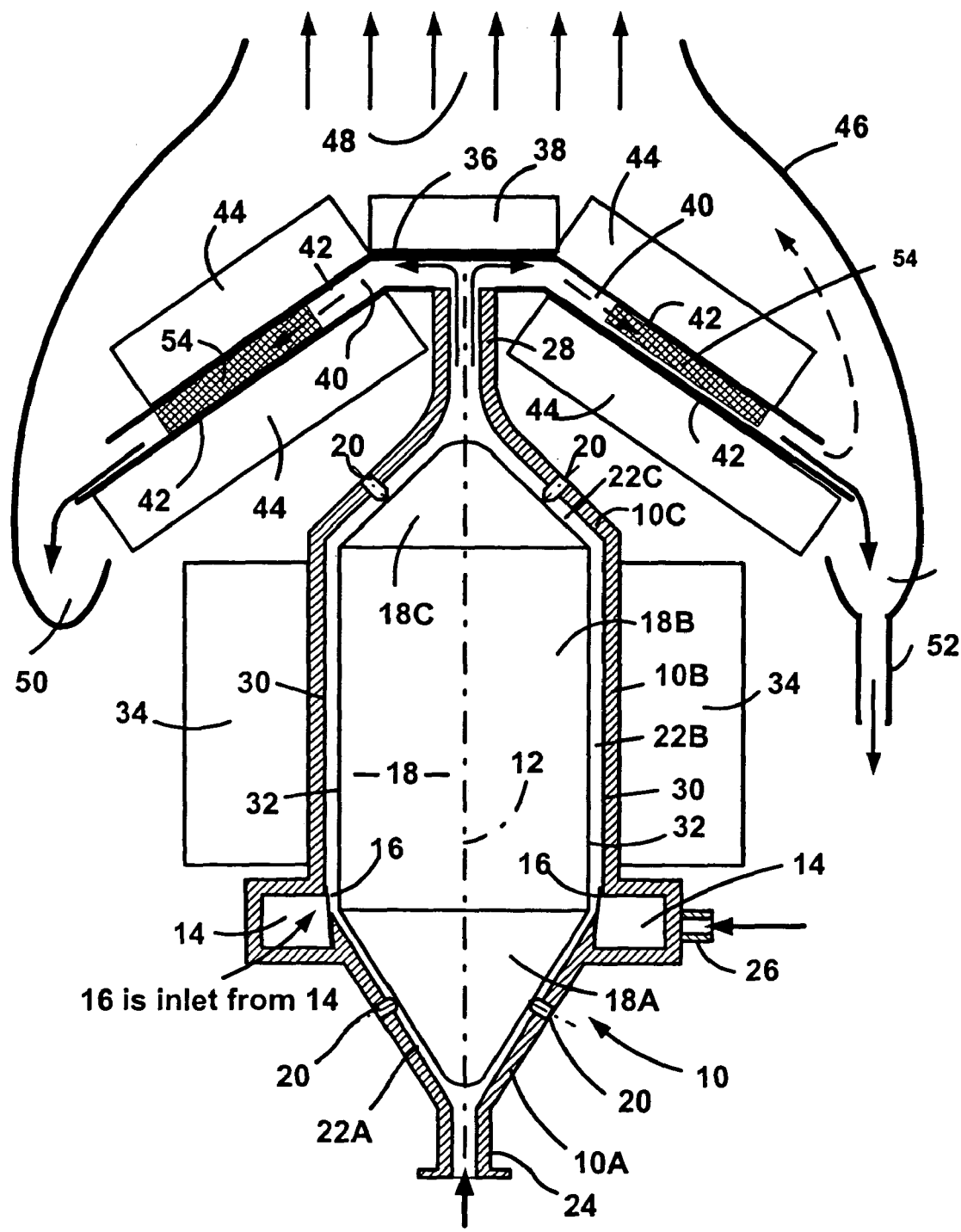
FIG. 1 is a longitudinal cross section through the apparatus.

10 Cylindrical outer casing
12 Longitudinal axis of casing 10 and inner body 18
14 Circumferential plenum to outer casing 10
16 Circumferential inlet from plenum 14
18, 18A, 18B, 18C Hollow inner body and parts thereof
20 Radial support struts between bodies 10 and 18
22, 22A, 22B, 22C Processing passage and portions thereof
24 Cylindrical inlet to passage 22
26 Side inlet to plenum 14
28 Outlet from passage 22
30 Inner cylindrical surface of outer member 10
32 Outer cylindrical surface of inner body 18
34 Heat exchanger surrounding outer member 10
36 Receptor plate at outlet 28
38 Heater for receptor plate 36
40 Frusto-conical passage receiving discharge from outlet 28
42 Structures forming passage 40
44 Heaters for passage 40
46 Toroidal shroud plate surrounding passage 40
48 Gas outlet from upper end of shroud 46
50 Trough at lower end of shroud 46
52 Liquid outlet from trough 50
54 Mist eliminator in passage 40
56 Roof
58 Upper flap
58A Upper flap contact portion
60 Lower flap
60A Lower flap contact portion

DETAILED DESCRIPTION OF THE INVENTION

The apparatus illustrated by FIG. 1 comprises a cylindrical outer casing 10 symmetrical about a longitudinal axis 12, the casing having an outward tapering inlet portion 10A connected with a central portion 10B of uniform diameter along its length, the central portion in turn being connected with inward tapering exit portion 10C. The casing 10 is formed with a circumferential plenum 14 having a circumferential inlet 16 to the interior of the casing 10. A hollow inner body 18 of approximately the same shape as the interior of the casing 10, but somewhat smaller in diameter, is mounted within the casing, as by streamline shaped radial struts 20, so as to have its longitudinal axis coincident with that of the casing 10. One example of such a radial strut is a set screw. The number and spacing of these radial struts 20 is dependent on the operating conditions and sizing of the components of the apparatus. Thus, the inner body has an inlet portion 18A, a central portion 18B and an exit portion 18C, so as to form between its exterior surface and the interior surface of the casing an annular cross section processing passage having an inlet portion 22A, a central portion 22B and an exit portion 22C.

Figure 2:
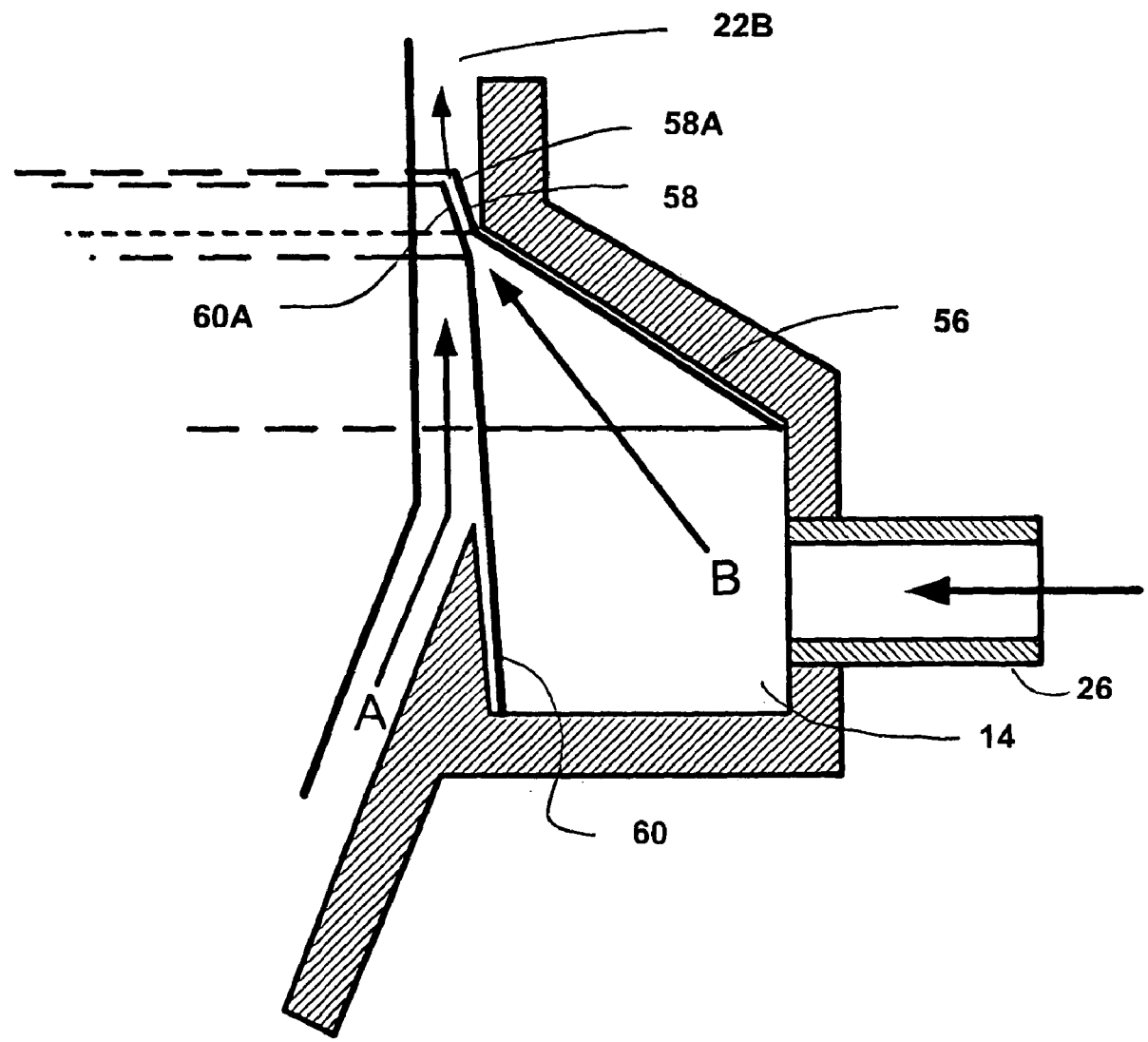
FIG. 2 is a cross sectional view of a portion of the plenum depicting a flow control mechanism.

The circumferential inlet 16 may be fitted with a flow control mechanism which allows the passage of material from plenum 14 in only one direction, namely, into the processing passage 22B, and blocks or restricts flow from the processing passage into the plenum. Depending on the reactions occurring in the apparatus, including the relative pressures of the reactants in passage 22 and plenum 14, a flow control mechanism may or may not be required. FIG. 1 shows a thin line at inlet 16, which indicates a very simple, thin, spring-like circumferential flap, which operates as a check valve. The material should preferably be flexible and nonreactive, such as stainless steel, or a Teflon like elastomer, one example being sold under the brand name KALREZ. Another version of such a flow control mechanism is depicted in FIG. 2. FIG. 2 also shows an internal shape of plenum 14 having a sloping roof 56. The shape of plenum 14 is a design expedient, and many shapes would work without impacting the invention described and claimed herein. Attached to roof 56 and extending into processing passage 22B is upper flap 58. Cooperating with upper flap 58 is lower flap 60, which is attached to the interior wall of plenum 14. When the pressure of reactant B is less than the pressure in passage 22, portions of flaps 58 and 60 are in contact with one another, namely contact portions 58A and 60A, and block or restrict flow of material from passage 22 into plenum 14. When the pressure of reactant B exceeds the pressure in passage 22, then the contact portions 58A and 60A separate, and reactant B flows into the passage 22B.

A first material to be processed in the passage is supplied to the passage inlet portion 22A through a cylindrical inlet 24 disposed with its longitudinal axis coincident with the axis 12 so that the material is fed uniformly into the annular passage. In the event that the material is a liquid or slurry, or otherwise pumpable, then it will be supplied under the urge of a pressure pump of sufficient capacity to feed the material into the passage at a corresponding required first flow rate; if on the other hand the material is a gas it can instead be supplied from a pressurized reservoir thereof through a pressure controlling valve. Such means for the supply of the material are known to those skilled in the art and do not require specific illustration herein. A second material to be processed in the passage is supplied to the junction of the passage inlet portion 22A and passage central portion 22B via a side inlet 26 feeding into the plenum 14, so that the material is fed uniformly into the annular passage and into the stream of the first material passing therein. Again, as with the first material, in the event that it is a liquid or slurry, or otherwise pumpable, then it will be supplied under the urge of a pressure pump of sufficient capacity to feed the material into the passage at a corresponding required second flow rate; if on the other hand the material is a gas it can instead be supplied from a pressurized reservoir thereof through a pressure controlling valve. The interdiffused, and possibly reacted, material that passes through the outlet portion 22C of the annular passage is discharged through an outlet 28.

As the material being processed flows through the processing passage a respective laminar boundary layer forms on each of the inner cylindrical surface 30 of the outer member 10 and the outer cylindrical surface 32 of the inner member 18, the thickness of which is determined by the viscosity and other factors of the material being processed and the flow velocity of the material over the surface. The thickness of such a laminar boundary layer for any fluid may be determined by the Blasius equation, which takes account of the path length of the flow, the flow velocity and the kinematic velocity. The internal diameter of the surface 30 and the external diameter of the surface 32 at the respective central portions 10B and 18B are such that the radial dimension of this portion 22B of the processing passage is just equal to the combined thicknesses of the two boundary layers back-to-back on these surfaces, or is so close to this value that there is no room between them for an intervening bulk layer thick enough to permit turbulent macro-agitation to be formed and disrupt the thorough interdiffusion that takes place of the materials in the two contacting laminar boundary layers. It has been discovered that such interdiffusion of highly sheared laminar boundary layers effects a significant increase in the speed and uniformity of molecular diffusion as is desired for very fast chemical reaction to take place. As a specific example, with apparatus in which the inner body 18 is of 7.5 cm external diameter a gap of 1–12 mm is likely to be required to ensure the absence of any bulk layer between the boundary layers of liquids having dynamic viscosities of 1.0 cP or higher; if the gap is increased to as little as 5 mm the resulting intervening turbulent bulk layer is almost certain to slow down the otherwise very fast interdiffusion and subsequent fast chemical reactions.

It is essential in order to ensure the required degree of interdiffusion while the materials are resident in the passage to maintain a minimum flow velocity in order to maintain the desired high shear interaction between the boundary layers. This velocity should not be less than about 5.0 meters per second. It is also desirable that the surfaces 30 and 32 should be of a certain degree of smoothness and inertness in order to prevent undue retention of liquid residues thereon. The normal machining of the cylindrical surfaces to the tolerances required for the parameters indicated above (e.g. a radial gap of 1–12 mm for a rotor 7.5 cm diameter) is insufficient and the resultant roughness of the surface, although not normally regarded as roughness, is still sufficient to allow thin deposits to form, and it is found desirable therefore to polish these surfaces to a so-called mirror finish, or better. The standard finish of 40 microinches is definitely too coarse, and a honed finish to at least 10 microinches, and preferably 5 microinches, is preferred.

The methods and apparatus of the invention are operable, for example, to quickly forcibly dissolve gases in liquids in which they are normally of low solubility, or to virtually instantaneously emulsify non-miscible liquids, or to chemically react two or more materials together with very high reaction rates, sometimes even in the absence of catalysts, surface active materials, etc., that frequently are required in conventional processes to obtain economically acceptable reaction rates. Some of the processes to which they are applicable will involve only physical interdiffusion of the materials fed into the apparatus, e.g. emulsification, while others will involve chemical reaction with or without the possibility of simultaneous physical interaction. In a number of the processes one of the materials fed, for example, into the passage 22 via the inlet 24 (the first material) may comprise a mixture of materials which will interdiffused and interact in the desired manner in its journey through the passage, while the material fed in through the inlet 26 (the second material) is an inert gas under high pressure, e.g. nitrogen or air, whose sole purpose is to produce an adequate flow rate of the first material through the passage. Many chemical reactions result in the production of gaseous products at the temperature and pressure of the reaction, and in the confined space of the processing passage this may be sufficient to produce the required accelerated flow rate through the passage. It will be noted that when such production does occur it will be necessary for the materials to be fed into the passage at a sufficiently high pressure so that the internal pressure generated does not cause blow-back of the materials.

In general, most chemical reactions and many physical reactions are to a greater or lesser degree either endothermic or exothermic, and many are quite strongly so. The higher reaction rates that are possible result in a corresponding considerably increased production or loss of heat, some of which can be transferred out of the apparatus via the exiting fluid/s, but the remainder of which must be transferred though the walls of the casing and/or inner body if the process temperature is to be maintained within required limits. Another factor that is important in such apparatus is that the heat conductivity of the two thin boundary layer films is very high, since there is no bulk layer between them through which the heat must pass, as with conventional bulk stirring systems. The achievement of the highest possible heat transfer rate, if possible higher than is strictly necessary in order to provide a margin for adjustment, is therefore desirable to ensure that the processing temperature can at all times readily be maintained within those required limits, which can constitute a very narrow range, e.g. 1° C. To such end the apparatus is provided with a heat exchanger structure 34 fitting snugly around the exterior surface of the outer body 10. This may be of any conventional known type, but preferably is an impingement heat exchanger as described and claimed in my U.S. application Ser. No. 60/318,985, filed Sep. 13, 2001 the disclosure of which is incorporated herein by this reference.

The apparatus specifically described is intended for operation with a process in which a copious quantity of gaseous material is a by-product of the reaction, with the result that a jet of the reacted material, consisting of a mixture of gas, vapor and liquid is delivered forcefully out through the outlet 28. The jet impinges on a receptor plate 36 heated by a heater 38, which diverts the stream radially outward to enter a frusto-conical shaped passage 40 formed between two correspondingly shaped structures 42. These structures are provided with a series of heaters 44 which are controlled to maintain the temperature of the passage 40 at a desired value. The plate 36 and structures 42 are surrounded by a toroidal shroud 46 having a gas outlet 48 at its upper end and providing a trough 50 at its lower end into which liquid in the discharge from the passage 22 that deposits on the lower structure 42 can drain and exit from the apparatus via an outlet 52. Vapor mist in the passage discharge decreases in velocity as it moves radially outward and will coalesce and also deposit on the lower frusto-conical structure 42 to drain into the trough 50; a mist eliminator 54, consisting for example of an conical annulus filling body of expanded metal, is disposed in the passage 40 to ensure that all the vapor is separated from the purely gaseous component.

The methods and apparatus of the invention therefore provide for interdiffusion of the materials fed to the processing passage for processes in which this is possible, without the need for relative rotation between the bodies 10 and 18, as is required with the processes and apparatus described in my pending U.S. application Ser. No. 09/802,037 (filed Mar. 7, 2001), considerably simplifying the apparatus and reducing its primary cost and cost of operation by the elimination of a drive motor, supporting bearings, etc.. Such savings may however be offset by the need for higher operating pressures to ensure that the materials are subjected to laminar shear of the required values as a result of their flow through the processing passage, and to ensure that fouling and obstruction of the passage does not take place.

In the embodiment illustrated the longitudinal axes of the two bodies 10 and 18 are coincident so that the passage 22 is of uniform radial dimension about its circumference. However, instead the two axes can be parallel and displaced so as to provide an interdiffusion mixing zone which is of cyclically variable radial dimension. Again, although in the embodiment particularly illustrated the bodies 10 and 18 are cylindrical and disposed one within the other, in other embodiments they can be flat and parallel to provide a passage of correspondingly flat shape between them. The cylindrical cross section structure has the advantage however that, with radially outward operating pressures acting against a circular structure, it is less difficult to maintain the very small radial gap forming the passage 22 to the very close tolerance required under the high pressures that could be required for successful continuous operation, whereas a flat structure is likely subject to warping and change of the passage dimensions under such conditions.

I claim:

1. A method comprising:
supplying a first material at a respective first flow rate to a flow path constituted by an interdiffusion passage between two closely spaced stationary surfaces;
supplying a second material to the flow path through the interdiffusion passage at a respective second flow rate, to be interdiffused with the first material therein, with resultant material from the interdiffusion and any consequent reaction moving in the flow path at a respective resultant flow rate;
wherein the first material and the second material each forms a boundary layer against one of the two closely spaced stationary surfaces and after interdiffusion the resultant material from interdiffusion and any consequent reaction of the materials forms boundary layers against both surfaces;
wherein the spacing between the two surfaces is equal to or less than the back-to-back thicknesses of the two boundary layers of material against the two surfaces, and if larger than the back-to-back thicknesses with a third layer between the two boundary layers has the third layer too thin to support turbulent convection or to cause channeling; and
wherein the flow rates of the materials in the flow path are great enough to maintain laminar flow.

2. The method as claimed in claim 1, wherein the flow rates of the materials are such that their medial linear velocity between the two spaced stationary surfaces is at least 5.0 meters per second.

3. The method as claimed in claim 1, wherein the Reynolds number of each respective flow material is less than the critical Reynolds number for the material.

4. The method as claimed in claim 3, wherein the Reynolds number of each respective flow material is less than 2000.

5. Apparatus comprising:
apparatus structure providing two parallel, closely spaced stationary surfaces constituting between them a flow path that is an interdiffusion passage;
means supplying a first material to the flow path through the interdiffusion passage at a respective first flow rate;
means supplying a second material to the flow path through the interdiffusion passage at a respective second flow rate, to be interdiffused with the first material therein, with resultant material from the interdiffusion and any consequent reaction moving in the flow path at a respective resultant flow rate and wherein the passage further comprises movement of each respective surface;
wherein the first and the second materials, and material resulting from interdiffusion and any consequent reaction of the materials, form respective boundary layers against both surfaces;
wherein the radial spacing between the two surfaces is equal to or less than the back-to-back radial thicknesses of the two boundary layers of the material against the two surfaces, and if larger than the back-to-back radial thicknesses with a third layer between the two boundary layers has the third layer too thin to support turbulent convection or to cause channeling; and
wherein the means supplying the first and second materials supply those materials at flow rates such that the materials in the passage are subjected to laminar shear of the value required for the interdiffusion based in part on the relative movement of the surfaces.

6. A method comprising:
supplying a first material at a respective first flow rate to a flow path constituted by an interdiffusion passage between two closely spaced stationary surfaces;
supplying a second material to the flow path through the interdiffusion passage at a respective second flow rate, to be interdiffused with the first material therein, with resultant material from the interdiffusion and any consequent reaction moving in the flow path at a respective resultant flow rate;
wherein the first material and the second materials each forms a boundary layer against one of the two closely spaced stationary surfaces and after interdiffusion the resultant material from interdiffusion and any consequent reaction of the materials forms boundary layers against both surfaces;
wherein the spacing between the two surfaces is equal to or less than the back-to-back thicknesses of the two boundary layers of material against the two surfaces, and if larger than the back-to-back thicknesses with a third layer between the two boundary layers has the third layer too thin to support turbulent convection or to cause channeling; and
wherein the flow rates of the materials in the flow path are such that they are subjected to laminar shear of the value required for the interdiffusion.

* * * * *